United States Patent
Tenorio Sanz et al.

(10) Patent No.: US 8,150,479 B2
(45) Date of Patent: Apr. 3, 2012

(54) TRANSMITTING FAX IN MOBILE NETWORKS

(75) Inventors: Santiago Tenorio Sanz, Madrid (ES); Andrea De Pasquale, Madrid (ES); Luis Gabriel Zas Couce, Madrid (ES); Francisco Javier Dominguez Romero, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 106 days.

(21) Appl. No.: 12/815,300

(22) Filed: Jun. 14, 2010

(65) Prior Publication Data

US 2011/0034173 A1    Feb. 10, 2011

(30) Foreign Application Priority Data

Jun. 12, 2009 (ES) .................................. 200930303

(51) Int. Cl.
*H04W 88/02* (2009.01)
(52) U.S. Cl. ...................................................... 455/574
(58) Field of Classification Search .................. 455/574; 370/352; 358/400, 1.15; 379/100.05
See application file for complete search history.

(56) References Cited

U.S. PATENT DOCUMENTS

| 5,136,585 A * | 8/1992 | Nizamuddin et al. ......... 370/271 |
| 7,362,853 B2 * | 4/2008 | Halkosaari ............... 379/114.12 |
| 2009/0086723 A1 * | 4/2009 | Henneke et al. .............. 370/352 |

* cited by examiner

*Primary Examiner* — Diane Mizrahi
(74) *Attorney, Agent, or Firm* — Workman Nydegger

(57) ABSTRACT

Fax transmission over a PLMN using a home gateway connected to the originating fax terminal equipment. A call setup request for a fax call destined towards terminating fax terminal equipment is sent. At the originating fax terminal equipment, a reply from the home gateway is received, sending data from the originating fax terminal equipment to the home gateway and storing them in the home gateway. A call establishment request from the home gateway to the PLMN and at least one connection establishment request from the home gateway to the terminating fax terminal equipment are sent. Waiting for a connection establishment confirmation from the terminating fax terminal equipment within a configurable time. When the connection establishment confirmation is received, sending from the home gateway stored data to the terminating fax terminal equipment through the PLMN and optionally a notification on the fax transmission status—to the originating fax terminal equipment.

7 Claims, 3 Drawing Sheets

TRANSMITTING FAX IN MOBILE NETWORKS

CROSS-REFERENCES AND RELATED APPLICATIONS

This application claims the benefit of the Spanish Patent Application No. ES P200930303, filed on Jun. 12, 2009, which is hereby incorporated by reference in its entirety.

TECHNICAL FIELD

Embodiments of the present invention relate to methods and a devices that connect fax machines to wireless digital communications networks (2G, 3G or beyond 3G networks) for fax transmission to the public switched telephone network (PSTN). The method and device allow storing fax data for relay.

BACKGROUND

Fax service is crucial in any business portfolio and so currently mobile network operators should provide a service to this type of customers with the requirements used in other data services supported by today wireless networks: security, seamless and fast service providing and operation. Nevertheless, commonly 3G network operators around the world don't support fax over their 3G networks and they usually work in conjunction with VoIP (Voice over IP) service providers to supply the fax service to customers. The typical situation is that the operators offer a fax service but this may be using their 2G networks.

Generally, enterprise customers with heavy fax traffic can use a fax server running on a server computer which is equipped with one or more fax-capable modems attached to PSTN by fixed telephone lines or, more recently, using software modem emulators which support T.38 ("Fax over IP") technology to transmit the signal over an IP network. Its function is to accept documents from users, convert them into faxes, and transmit them, as well as to receive fax calls and either store the incoming documents or pass them on to users. Users may communicate with the server in several ways, through either a local network or the Internet. In a big organization with heavy fax traffic, the computer hosting the fax server may be dedicated to that function, in which case the computer itself may also be known as a fax server.

The typical scenario where T.38 is used is T.38 Fax relay (ITU-T Recommendations), wherein a T.30 fax device sends a fax over PSTN to a T.38 Fax gateway which converts or encapsulates the T.30 protocol into T.38 data stream. This is then sent either to a T.38 enabled end point such as fax machine or fax server or another T.38 Gateway that converts it back to PSTN G.711 or PCM (pulse-code modulation) or analogue signal and terminates the fax on a T.30 device.

At present there are many types of fax transmission techniques depending on the application: analogue faxes of any Group specified to conform the ITU-T Recommendations (T.2 G1 devices and T.30 or T.3 G2 devices), faxes in any of the defined Groups for digital formats (T.30 or T.4 G3 and G4 for T.563, T.503, T.521, T.6, T.62, T.70, T.72, T.411 to T.417), and FAX over IP (T.38). Whatever the supportable version is, the Fax service as such is widely used over the fixed line.

The specifications for (2G and 3G) wireless networks establish voice, data and fax as basic standard services. Today, mobile network operators provide Home routers or Home/Residential Gateways (HG) to ensure continuity between the home local area network (LAN) with the in-home connected devices such as fixed telephones or Faxes and the external world represented by a wide area network (WAN). The WAN connectivity to the fax machine using the HG may be provided through (A)DSL, a cable modem, or a broadband mobile phone technology (2G, 3G or beyond).

SUMMARY OF DISCLOSED EMBODIMENTS

Embodiments of the present invention serve to solve the aforesaid problems on lack of fax transmission over a public land mobile network (PLMN) when using a Home routers or Gateway (HG) by providing a Home Gateway with the capabilities needed in order to implement the fax transmission over any mobile network (2G, 3G or beyond 3G). Disclosed embodiments allow the HG to act as an agent for delayed fax transmission, in which the fax transmission is first handled between the HG and the connected fax machine originating the call and then from the HG and the destination fax machine.

This HG acts as a fake terminating fax machine, receiving the whole FAX transmission, storing the content, and later on, when connection to the real destination, a terminating fax machine normally connected to the public switched telephone network (PSTN), is established through the PLMN, the HG performs the fax transmission over said connection (using either 2G-3G Call Switching or CS, either 3G-beyond 3G Packet Switching or PS, in case a PS to CS conversion is included in the Core Network). Once all the data of the fax call are transmitted (and successfully or not reach the terminating fax machine), the HG sends an OK to the originating fax machine. Additionally, the HG can receive either an ACK or a NACK from the terminating fax machine and the informed the originating fax machine on the current status of the fax transmission in order to set next planned attempts. In case of a failure notification, the HG can retry an amount of X times the fax transmission of the stored data within a time period of Y minutes.

One example embodiment refers to a method for transmitting fax in radio networks, from a fax terminal equipment which originates the fax call towards a terminating fax terminal equipment which is the call destination, through a home gateway (HG) connected to the originating fax terminal equipment and the PLMN. The method comprises the following steps:

sending a call setup request from the originating fax terminal equipment and receiving it at the HG, receiving at the originating fax terminal equipment a reply from the HG which provisionally acts as the terminating fax terminal equipment, after said reply is received, sending every data of the fax call from the originating fax terminal equipment to the HG so that the HG can store them after having all the data stored by the HG, sending a call establishment request from the HG to the PLMN and at least one connection establishment request from the HG to the terminating fax terminal equipment in order to carry the fax data over a radio connection and relay them towards the PSTN which the terminating fax terminal equipment is connected to, within a time period configurable at the HG, waiting for a connection establishment confirmation from the terminating fax terminal equipment indicating that the connection is established, when this connection establishment confirmation is received within the configurable time period, sending every stored data by the HG to the terminating fax terminal equipment through the PLMN.

In addition, the HG can be configured for waiting for receiving a reply from the terminating fax terminal equipment, after sending to it all the stored data. The terminating fax terminal equipment can send an acknowledgement reply (ACK) or a negative acknowledgement reply (NACK).

In any case, after every stored data of the fax call is sent by the HG to the terminating fax terminal equipment, a provisional confirmation reply can be sent from the HG to the originating fax terminal equipment. The provisional confirmation reply becomes a definitive OK if the terminating fax terminal equipment ends sending an ACK. Otherwise, the provisional confirmation reply from the HG is a pending OK and a second confirmation reply can be sent by the HG to notify the originating fax terminal equipment whether there is or there is not acknowledged receipt of all the fax data, depending on the reply (either ACK or NACK in the respective cases) finally received from the terminating fax terminal equipment.

Different level of acknowledgement towards the originating fax terminal equipment can be chosen when configuring the HG:

- Feedback provided by the HG only when the reply from the terminating fax terminal equipment is received, using a timer at the HG for waiting for a maximum period for an ACK or NACK from the terminating fax.
- Feedback provided by the HG within Z seconds from the instant when the transmission starts (which begins when sending the call setup request from HG to the PLMN) whichever is the reply (ACK/NACK) from the terminating fax terminal equipment. In case that no ACK is received within a certain time (configurable by the MNO), the originating fax terminal is informed of the current status of the fax transmission and more attempts can be planned.

Another example embodiment deals with a device which comprises a modem for connection to a mobile network (either 2G or 3G modem) and processing means for performing the method described before, constituting a Home Gateway (HG) for connection to fax machines which acts as a fake fax terminal to receive the fax calls from said fax machines and retransmit them (by one or more retries) towards the current destination fax terminal.

This HG device is capable to support both a connection to the WAN which is a PLMN (e.g., a 3G connection) and a connection with the PSTN (e.g., by a DSL connection). Thus, the HG is capable to detect the unavailability of the fixed link (e.g., DSL failure), for example, in these two common scenarios: Instant activation (i.e. before the delivery of the DSL line to customer premises) or Backup (when the DSL fails during the lifecycle of the connection). In this case, the HG uses the PLMN connection to retransmit the fax call.

A major advantage of disclosed embodiments is that it allows the Mobile Network Operators (MNOs) to provide all the customer segments (including the single office/home office or SOHO customer) with the FAX service in all the situations in which MNOs serve total communications (i.e., granting data connectivity, quick activation, protected service, etc.) in which the usage of a Home Gateway (HG) is foreseen (i.e., replacing the existing fixed lines by the mobile networks).

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF EXAMPLE EMBODIMENTS

Figure 1:
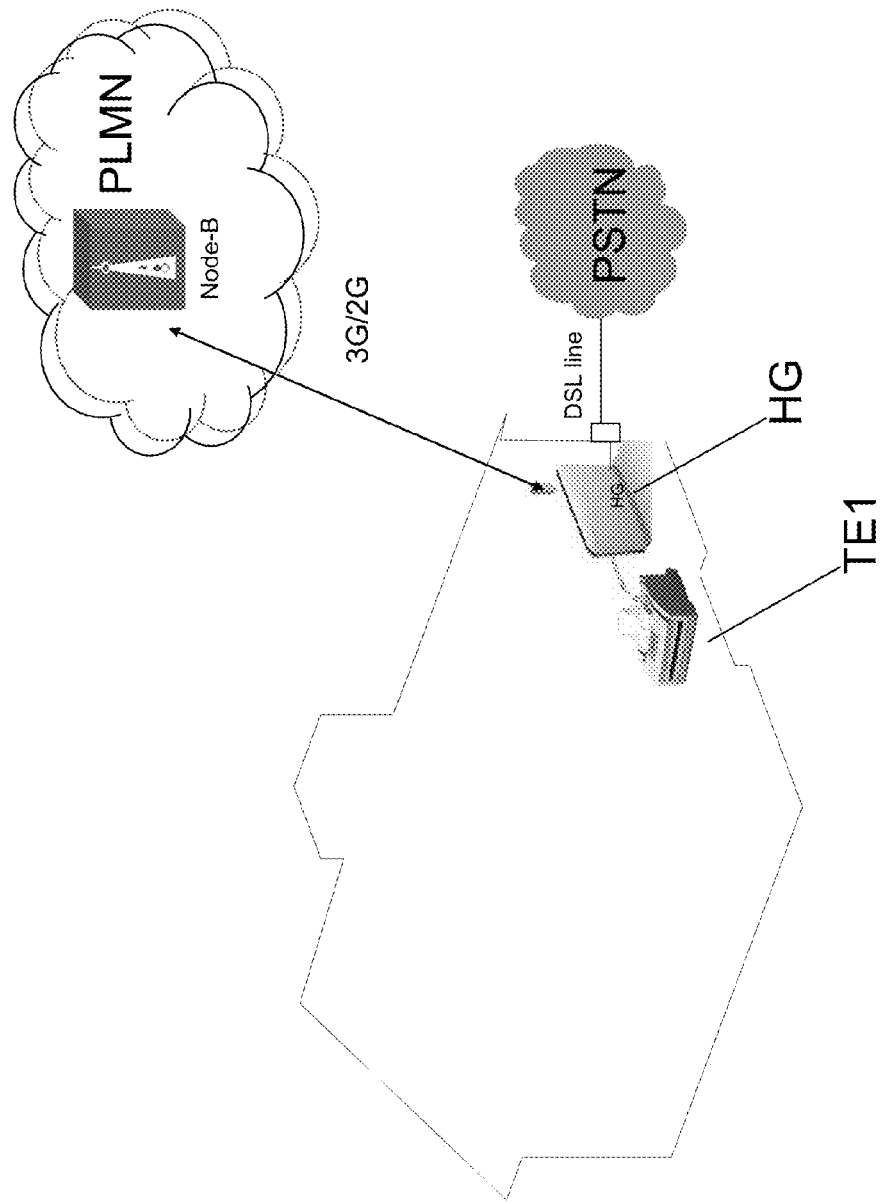
FIG. 1.—shows a home gateway connected to wide area mobile and fixed networks and connected through a local area network to a fax machine for transmission of fax calls from the fax machine through either the fixed either the mobile network, according to a preferred embodiment of the invention.

FIG. 1 shows a typical SOHO scenario in which a in-home fax terminal equipment (TE1) is connected to a Home Gateway (HG), according to a preferred embodiment of the invention. The Home Gateway (HG) can be connected to a fixed network (PSTN), through a DSL line for instance, as well as to a mobile network (PLMN) by 2G or 3G technology used for fax data transmission from the fax terminal equipment (TE1) originating the fax call to a terminating fax terminal equipment (TE2).

Figure 2:
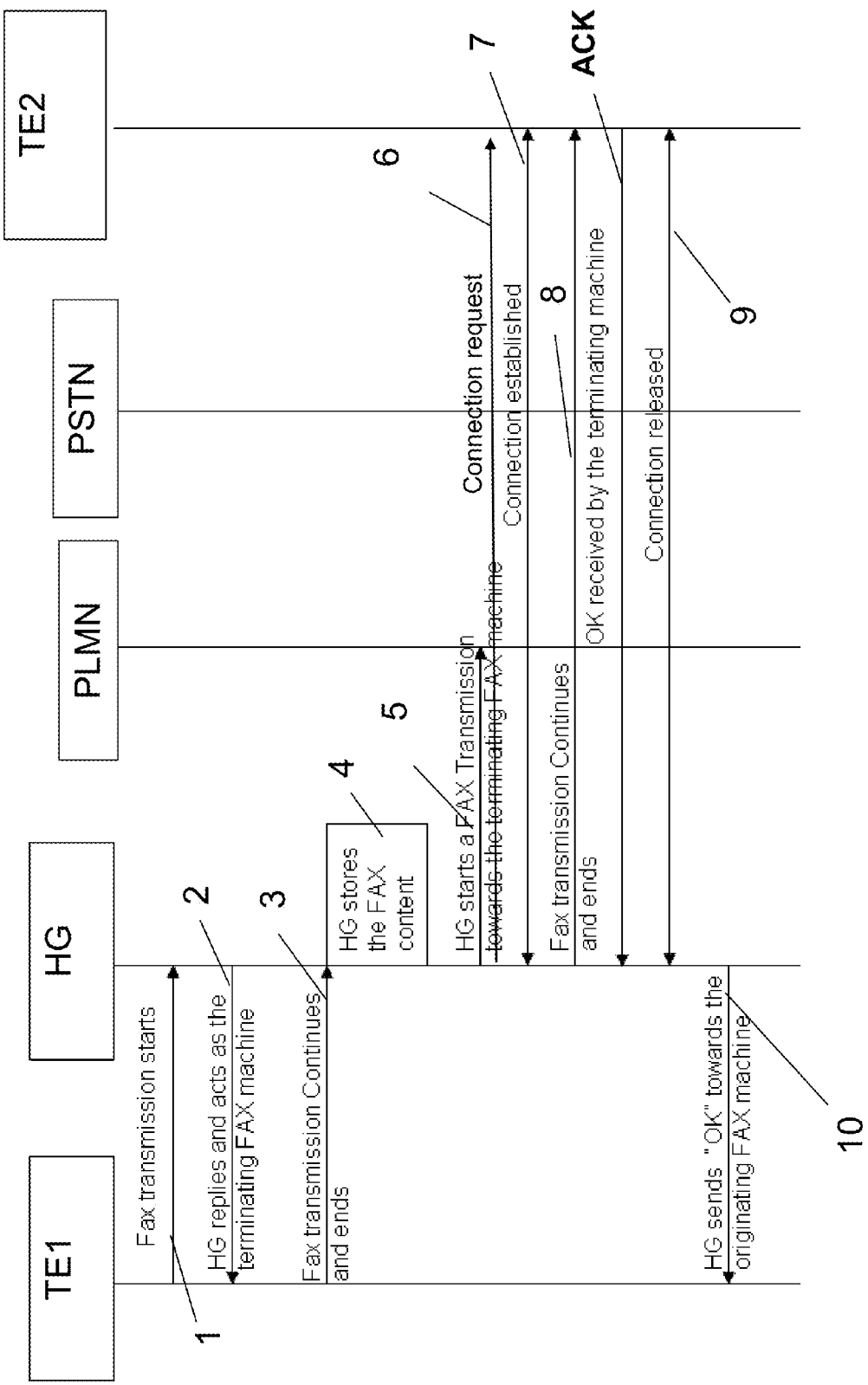
FIG. 2.—shows a message diagram representation of the method for fax transmission by the home gateway through the mobile network to a destination fax machine connected to the fixed network and in case of success in transmission, according to a possible embodiment of the invention.
Figure 3:
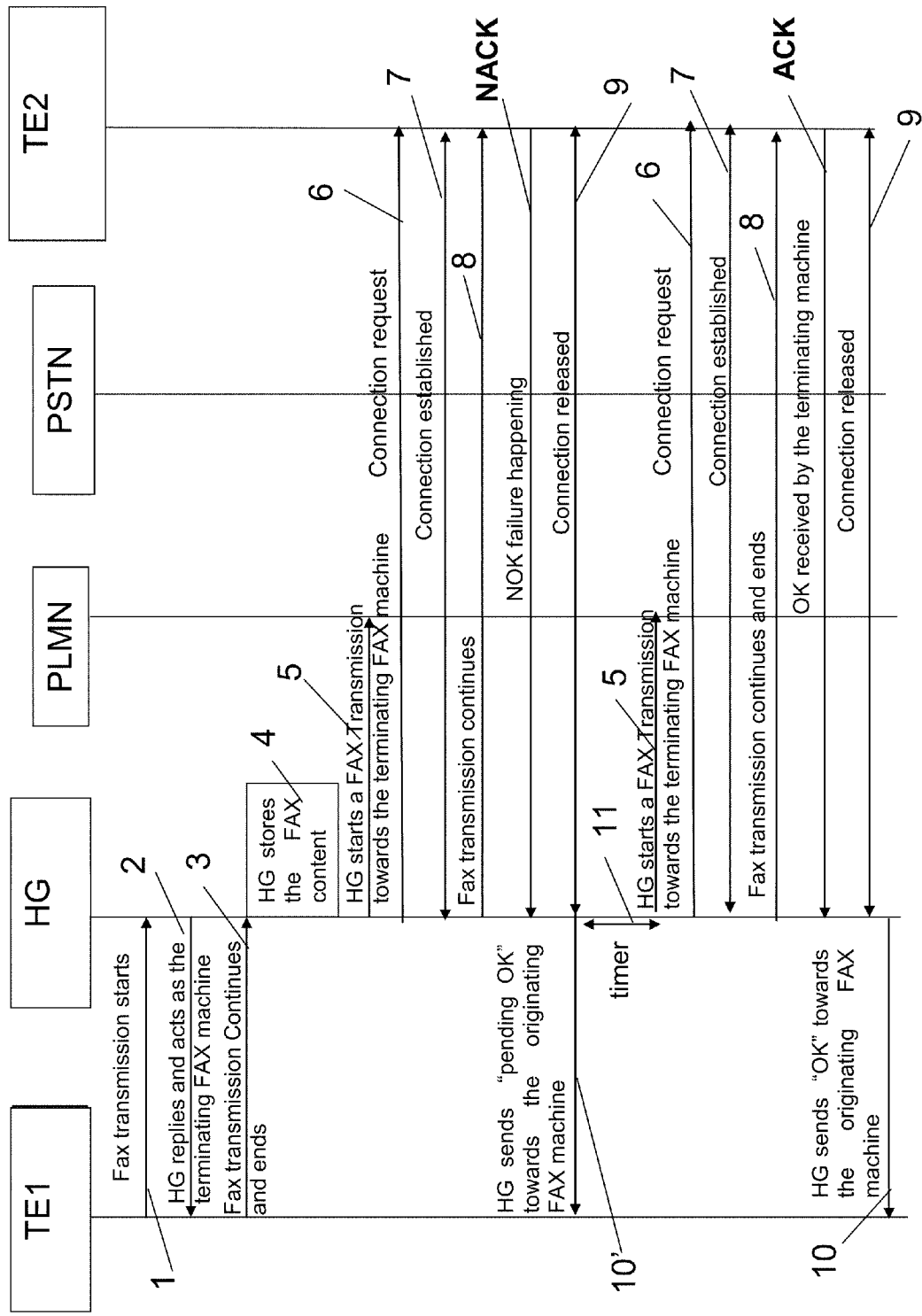
FIG. 3.—shows a message diagram representation of the method for fax transmission by the home gateway through the mobile network to a destination fax machine connected to the fixed network and in case of failure in transmission, according to another possible embodiment of the invention.

FIGS. 2 and 3 show some examples of how the fax data transmission is carried out through the mobile network (PLMN) by the interoperation of Home Gateway (HG) with the originating fax terminal equipment (TE1) and the terminating fax terminal equipment (TE2).

FIG. 2 shows the case in that the fax data transmission is completed with success in a first trial and the terminating fax terminal equipment (TE2) acknowledges the receipt of all the fax data stored and relayed by the Home Gateway (HG), which operates as follows:

- the Home Gateway (HG) receives a call setup request (1) from the connected originating fax terminal equipment (TE1) for a fax call destined towards the terminating fax terminal equipment (TE2);
- the Home Gateway (HG) sends a reply (2) to the call setup request (1), acting as a fake fax, which is received by the originating fax terminal equipment (TE1);
- the Home Gateway (HG) receives from the originating fax terminal equipment (TE1) all the data (3) of the fax call, as the Home Gateway (HG) assumes the role of the terminating fax terminal equipment (TE2), and stores (4) every data to transmit them in one or more trials through the mobile network (PLMN) to the fixed network (PSTN) which the terminating fax terminal equipment (TE2) is connected to;
- in order to start the data transmission, firstly the Home Gateway (HG) sends a call establishment request (5) to the mobile network (PLMN) and sends a connection establishment request (6) to the terminating fax terminal equipment (TE2) connected to fixed network (PSTN);
- as soon as the home gateway (HG) receives a connection establishment confirmation (7) from the terminating fax terminal equipment (TE2), the home gateway (HG) goes on relaying all the stored data (8) of the fax call to the terminating fax terminal equipment (TE2) through the mobile network (PLMN);

after an acknowledgement reply (ACK) from the terminating fax terminal equipment (TE2) is received and the connection with the fixed network (PSTN) and the mobile network (PLMN) is released (9), the home gateway (HG) ends its operation by sending a confirmation reply (10) to the originating fax terminal equipment (TE1) in order to notify an acknowledged receipt of the fax call to the originating user.

In case that a failure happens during the fax transmission from the home gateway (HG) to the terminating fax terminal equipment (TE2), as in the example shown in FIG. 3, the terminating fax terminal equipment (TE2) sends a negative acknowledgement reply (NACK) and the connection is released (9) before all the stored data (8) are relayed by the home gateway (HG). Since the home gateway (HG) has every data of the fax call already stored, the home gateway (HG) can send a provisional confirmation reply (10) to originating fax terminal equipment (TE1) and retry to transmit all the stored data (8) after a timer (11) expires. The home gateway (HG) performs the number of retransmissions needed to send all the data until receiving an acknowledgement reply (ACK) from the terminating fax terminal equipment (TE2) and finally sending the confirmation reply (10) to the originating fax terminal equipment (TE1).

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for transmitting fax in mobile networks, comprising:
    sending a call setup request for a fax call destined towards a terminating fax terminal equipment, from an originating fax terminal equipment to a home gateway connected to the originating fax terminal equipment and connected to a mobile network;
    receiving, at the originating fax terminal equipment, a reply from the home gateway;
    when the reply from the home gateway is received, sending every data of the fax call from the originating fax terminal equipment to the home gateway;
    storing every data of the fax call in the home gateway,
    sending a call establishment request for the fax call destined towards the terminating fax terminal equipment, from the home gateway to the mobile network,
    sending at least one connection establishment request from the home gateway to the terminating fax terminal equipment,
    waiting for at least one connection establishment request being accepted by the terminating fax terminal equipment and receiving a connection establishment confirmation from the terminating fax terminal equipment within a configurable time period,
    when the connection establishment confirmation is received by the home gateway within the configurable time period, sending every stored data of the fax call to the terminating fax terminal equipment from the home gateway through the mobile network.

2. The method according to claim 1, further comprising waiting for receiving at the home gateway, after sending all the stored data of the fax call, a reply from the terminating fax terminal equipment which is selected from an acknowledgement reply or a negative acknowledgement reply.

3. The method according to claim 1, further comprising sending a provisional confirmation reply, after every stored data of the fax call is sent to the terminating fax terminal equipment, from the home gateway to the originating fax terminal equipment.

4. The method according to claim 3, wherein the provisional confirmation reply from the home gateway is sent within a certain time which starts when sending the call setup request for the fax call from the home gateway.

5. The method according to claim 2, wherein the provisional confirmation reply from the home gateway is sent after the reply from the terminating fax terminal equipment is received.

6. The method according to claim 5, wherein:
    when the acknowledgement reply from the terminating fax terminal equipment is received within a configurable maximum time interval, the provisional confirmation reply from the home gateway indicates an acknowledged receipt of all the stored data of the fax call;
    otherwise, the provisional confirmation reply from the home gateway indicates that there is no acknowledged receipt of all the stored data of the fax call.

7. The method according to claim 2, wherein:
    when the acknowledgement reply from the terminating fax terminal equipment is received within a configurable maximum time interval, the home gateway sends a second confirmation reply to the originating fax terminal equipment, the second confirmation reply indicating an acknowledged receipt of all the stored data of the fax call;
    otherwise, the home gateway sends a second confirmation reply to the originating fax terminal equipment, the second confirmation reply indicates that there is no acknowledged receipt of all the stored data of the fax call.

* * * * *